United States Patent [19]

Alfes et al.

[11] Patent Number: 4,734,484
[45] Date of Patent: Mar. 29, 1988

[54] PROCESS FOR THE ISOLATION OF POLYARYLENE SULPHIDE FROM SALTS CONTAINED THEREIN

[75] Inventors: Franz Alfes; Wolfgang Alewelt, both of Krefeld; Wolfgang Eisermann, Duesseldorf; Erhard Tresper, Krefeld, all of Fed. Rep. of Germany

[73] Assignee: Bayer Aktiengesellschaft, Leverkusen-Bayerwerk, Fed. Rep. of Germany

[21] Appl. No.: 912,770

[22] Filed: Sep. 26, 1986

[30] Foreign Application Priority Data

Oct. 4, 1985 [DE] Fed. Rep. of Germany ....... 3535455

[51] Int. Cl.$^4$ .............................................. C08G 75/16
[52] U.S. Cl. ...................................... 528/502; 528/388
[58] Field of Search ................................ 528/502, 388

[56] References Cited

U.S. PATENT DOCUMENTS

| | | | |
|---|---|---|---|
| 3,457,242 | 7/1969 | Hill | 260/79 |
| 4,421,874 | 12/1983 | Seefluth | 528/498 |
| 4,464,507 | 8/1984 | Ostlinning et al. | 524/710 |
| 4,500,706 | 2/1985 | Mathis et al. | 528/502 |

FOREIGN PATENT DOCUMENTS 96384 12/1983 European Pat. Off. .
102536 3/1984 European Pat. Off. .

*Primary Examiner*—Harold D. Anderson
*Attorney, Agent, or Firm*—Connolly and Hutz

[57] ABSTRACT

The invention relates to a process for the isolation of polyarylene sulphides, polyarylene sulphides with particularly low electrolyte content being obtained.

1 Claim, No Drawings

PROCESS FOR THE ISOLATION OF POLYARYLENE SULPHIDE FROM SALTS CONTAINED THEREIN

The invention relates to a process for the isolation of polyarylene sulphides, polyarylene sulphides with particularly low electrolyte content being obtained.

Polyarylene sulphides, their preparation and isolation are known (e.g. U.S. Pat. No. 2,513,188).

In general, to isolate polyarylene sulphides, the heterogeneous product solution containing salts is precipitated after the reaction. The inorganic salts are washed out of the precipitated polyarylene sulphide with water. Subsequently, the polyarylene sulphide, containing up to 500% by weight (referred to polymer) of water and/or other extraction media, is dried at elevated temperature, if appropriate in vacuum. Nevertheless, residual amounts of ≧1000 ppm of chloride can be detected in the dried polyarylene sulphide.

It has now been found that polyarylene sulphides with very low residual electrolyte content and greatly improved electric properties are obtained if the produced common salt, unreacted sulphide and, if applicable, further reaction-promoting salts which are present in the solid phase in the reaction solution are separated off before precipitation of the reaction solution by processes which are known in principle, at temperatures above the solidification point of the solution.

The polyarylene sulphides, which can also be branched, can be prepared, for example, by reaction of dihaloaromatics, if appropriate with addition of tri- and tetrahaloaromatics and alkali metal sulphides in organic solvents according to known processes, if appropriate under excess pressure.

According to the invention, the reaction solution is filtered through a heated pressure filter after the polymerization reaction. As filter media, wire sieves or sinter plates which are stable under these conditions, are used preferably, the mesh sizes or pore sizes of which can be adjusted over a wide range and which depend on the selected filter conditions, e.g. viscosity of the solution, filter pressure, temperature, on the desired degree of purity of the filtrate, etc. The technical equipment used for the filtration is known, for example simple pressure filters, agitated pressure filters, trailing blade centrifuges and rotary filters can be used, amongst others.

The invention therefore relates to a process for working up of a reaction solution as results after the polymerization during the preparation of polyphenylene sulphide, characterized in that the reaction solution after completed reaction is filtered, if appropriate under pressure, at temperatures >180° C., preferably >210° C., through a heated pressure filter comprising wire sieves or sinter plates the pore sizes of which are adjustable in the range from 0.5 to 500, preferably 10 to 200 $\mu$m.

A preferred embodiment uses the same filter which is already covered with common salt, the salt-filter layer being reduced from above, before the second filtration step, down to a residual layer of 0.5–1 cm according to an advantageous embodiment. The common salt can be extracted once or several times with hot organic solvent, preferably the solvent of the polyarylene sulphide reaction, the polymer content in the common salt dropping to values under 0.05%. The process according to the invention permits more than 90%, preferably more than 98%, of the salts contained in the reaction solution to be separated off.

A further advantageous procedure, especially suitable for continuous operation, is to feed the reaction solution to a heated decanter centrifuge before the actual filtration. The salts can be separated off, washed and dehumidified in the decanter so that a relatively low-salt product solution can be fed to the subsequent filtration step. A preferred embodiment is the remixing of the separated salts with the solvent used for washing and a second solid-liquid separation in the decanter centrifuge, the solvent being fed back to the first separation step or to the reaction.

The common salt obtained can be further processed in the normal way.

The reaction solution, freed from suspended salts, according to the invention, is worked up further in a known fashion. For example, it can be introduced into a precipitation medium such as water or a water-containing medium and the polyarylene sulphide thus precipitated and further purified.

The precipitate obtained can be a coarse or fine powder or fibrous or flaky, or, if it proves to be advantageous, can be converted to a corresponding different form before the further processing. It is a particular advantage of the process that the water-soluble contaminants are present in the separated-off common salt, so that washing the separated-off polyarylene sulphide can be dispensed with, depending on the filtration quality. If appropriate, the precipitate is extracted with organic extraction media to remove the organic solvent and to ensure gentle drying.

The products treated by the process according to the invention are distinguished by low mould corrosion and particularly good electric properties. They can be mixed with other polymers, pigments and fillers, for example graphite, metal powder, glass powder, quartz powder or glass fibres, or mixed with the usual additives for polyarylene sulphides, for example the usual stabilizers and mould release agents. They can be processed directly to foils, moulded articles or fibres by extrusion, extrusion blowing, injection moulding or other usual processing techniques. These products can be used in the normal way, e.g. as car parts, fittings, electrical parts, e.g. switches, printed circuit boards and electronic panels, chemical-resistant and weather-proof parts such as pump housings and pump impellers, caustic bath dishes, sealing rings, parts for office machinery and telecommunication equipment, as well as household appliances, valves or ball bearing parts.

Preparation of a polyphenyl sulphide 1,290 g of sodium sulphide trihydrate (=10.0 moles of $Na_2S$), 204.1 g of sodium acetate trihydrate (15 mole %, referred to $Na_2S$) and 4000 ml of N-methylcaprolactam are placed in a mixing vessel fitted with a stirrer and distillation attachment and heated to 200° C. A liquid which essentially comprises water distils off.

1,470 g of 1,4-dichlorobenzene, dissolved in 500 ml of N-methylcaprolactam, is then added and the reaction mixture heated to 240° C. and maintained at this temperature for 5 hours.

EXAMPLE 1

The contents of the mixing vessel are placed in a pressure filter, heated to 220° C., which is fitted with a wire mesh of mesh size 40 δm. The batch is filtered, with a nitrogen pressure of 4 bar, through the common salt which is depositing on the wire mesh into a receiver, which is heated to 220° C. The NaCl content in the filtered solution is under 0.2%. The reaction mixture is then transferred, with vigorous stirring, to 30 l of initially introduced water which has been adjusted to pH 1 with phosphoric acid. The precipitated polyphenyl sulphide is then washed with water until the washings have a conductivity of $\leq 20$ μS.

After drying the polyphenylene sulphide in vacuum at 140° C. for 8 hours, the chloride content of the polymer is below 1 ppm. The product is pressed to a 2-mm-thick, rectangular plate with dimensions 30×30 mm; the electrical breakdown voltage is <100 kV/mm at 20° C.

A comparison batch the salt of which was not separated off before precipitation is washed in the same way and measured. The electrical breakdown voltage of a 2-mm-thick rectangular plate with dimensions 30×30 mm is 39 kV/mm.

EXAMPLE 2

The 60 fold batch of a polyphenylene sulphide is prepared as described above in a 600 l capacity stirred kettle. The NaCl-containing suspension is pressed, via the central suspension feed, at a speed of 40 l/minute onto a decanter, heated to 220° C., the drum of which rotates at a speed of 2000 revolutions per minute. The deposited salt is moved in the direction of the smaller diameter by means of a worm driven at a speed differing from that of the drum by 14 revolutions per minute, and is thrown off there. The clarified liquid runs over to the other end of the drum into a pressure filter, heated to 220° C., which is fitted with a sinter plate with pore size 20 μm. The batch is filtered with a nitrogen pressure of 5 bar into a receiver which is heated to 220° C. The NaCl content in the filtered solution is under 0.1%. The filtered solution is then transferred, with vigorous stirring, into 3000 l of water which has been adjusted to pH 1 with hydrochloric acid. The precipitated polyphenyl sulphide is then washed with distilled water until the washings have a conductivity $\geq 20$ μS.

After drying the polyphenyl sulphide at 140° C. for 8 hours, the chloride content of the polymer is less than 1 ppm. An injection-moulded test piece with dimensions 120×15×4 mm had a creep resistance according to DIN 53480 of 150 and an ash content of 0.02%.

A comparison batch the salt of which was not separated off before precipitation was washed, dried and measured in the same way. The creep resistance according to DIN 53480 amounted to 50, the ash content 0.2%.

We claim:

1. An improved method for separating inorganic salts from a crude polyarylene sulfide reaction product which contains inorganic salts, polyarylene sulfide and an organic solvent to obtain a substantially salt-free polyarylene sulfide comprises:
   (a) passing the crude polyarylene sulfide reaction product through a heated decanter centrifuge to obtain a solid salt and a clarified liquid,
   (b) then passing the clarified liquid from step (a) through a heated pressure filter at a temperature greater than 180° C. wherein the filter comprises wire sieves or sinter plates heaving an adjustable pore size ranging from 10 to 200 μm to obtain a solution of polyarylene sulfide substantially salt-free.

* * * * *

UNITED STATES PATENT AND TRADEMARK OFFICE
CERTIFICATE OF CORRECTION

PATENT NO. : 4,734,484
DATED : Mar. 29, 1988
INVENTOR(S) : Alfes et al.

It is certified that error appears in the above-identified patent and that said Letters Patent is hereby corrected as shown below:

In col. 2, line 67, "40 $\delta$ m" should correctly read --40 $\mu$m--.

Signed and Sealed this

Twenty-second Day of November, 1988

Attest:

DONALD J. QUIGG

*Attesting Officer*  *Commissioner of Patents and Trademarks*